April 29, 1947.  A. NICKELL  2,419,788
COW STANCHION
Filed Feb. 16, 1944
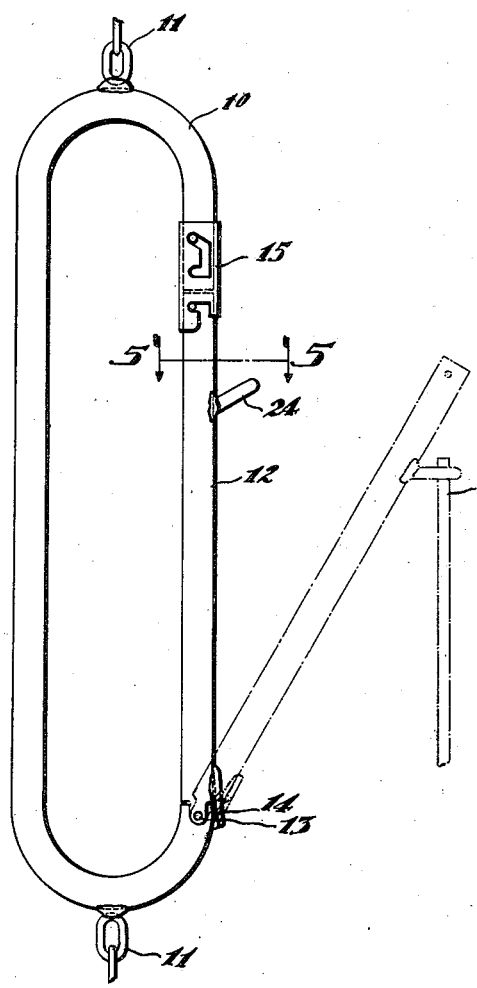
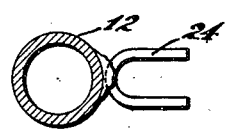
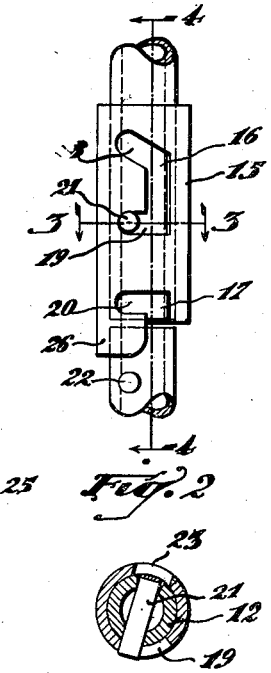
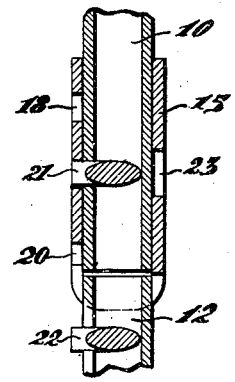
INVENTOR.
Arthur Nickell
BY
Wood, Arey, Herron & Evans
Attorneys.

Patented Apr. 29, 1947

2,419,788

UNITED STATES PATENT OFFICE 2,419,788

COW STANCHION

Arthur Nickell, Amelia, Ohio

Application February 16, 1944, Serial No. 522,591

2 Claims. (Cl. 119—149)

1

This invention relates to a stanchion for confining cows or other domestic animals in a fixed position in a cowshed or similar building during milking, feeding and the like. The invention is particularly directed to a structure of this type which may be quickly and cheaply manufactured and which has certain important advantages not found in similar devices as heretofore manufactured.

In the construction of a cow stanchion it is particularly important that the latching means utilized to hold the stanchion in closed position when the animal is confined therein be at least equally as strong as the other portions of the stanchion. The reason for this is that a domestic animal such as a cow when confined in a stanchion tends to buck and twist in all directions, exerting a substantial strain against all portions of the stanchion. If there is any point of weakness, the animal's activities will inevitably cause a rupture at that point and the device will be rendered inoperative. It is also essential that the locking means be very strong and secure against accidental unlatching but at the same time be conveniently operable with slight effort by the attendant as it is frequently necessary to latch or unlatch the locking means with one hand while maintaining a hold on the animal with the other. Another desirable characteristic of the latching means is that it should be readily unlatchable regardless of the position of the animal in the stanchion. For example, the latch should work just as readily when the animal is rearing back as when she is standing quietly.

With the purpose of providing a cow stanchion which includes all of the advantages just enumerated and certain other advantages which will be commented on subsequently, one of the objects of the present invention has been to provide a cow stanchion in which the latching means or lock is of the sleeve type, the sleeve being slidable on the main elements of the stanchion to provide alternate latching or unlatching as desired.

Another object of the invention has been to provide a latching means of the general type described which, in addition to providing the lock for opening and closing the stanchion, also serves as a reenforcing element over the open portion of the stanchion.

Another object has been to provide a stanchion latch which is strong and sure in its operation, particularly easy to connect and disconnect, and equally effective regardless of the extent and direction of the stress exerted against the stanchion by the animal confined therein.

Another object has been to provide a stanchion latch in which a particularly effective locking arrangement is obtained with a minimum of effort on the part of the attendant.

Another object has been to provide a stanchion in which the number of parts has been reduced and simplified to greatly facilitate the problem of manufacture.

Other and further objects and advantages will be apparent from the further and more detailed description of the invention when considered in conjunction with the drawings in which:

Figure 1 is a front elevation of the stanchion in locked position, the position of the gate bar and accessory parts in open position being indicated by broken lines.

Figure 2 is an enlarged detailed view of the latching arrangement with the latch in open position.

Figure 3 is a sectional view along the line 3—3, Figure 2.

Figure 4 is a sectional view along the line 4—4, Figure 2.

Figure 5 is a sectional view along the line 5—5, Figure 1.

Referring now to the drawings for the further and more detailed description of the invention of which a preferred embodiment is therein illustrated, the stanchion includes a generally C-shaped collar element indicated as 10. This element is preferably formed from hollow steel pipe of a conventional type and dimensions. Pivotal attachment elements 11 are provided at the upper and lower surfaces of the collar for fixing the stanchion in operative position. Conventionally, the attachment elements are secured to rails or beams, the opening for the enclosure of the head and neck of the animal being disposed at an appropriate height from the ground.

A gate bar element 12 formed from the same material as the C-shaped collar is pivotally secured to the latter element at 13. A skirt type stop means 14 may be secured to the gate bar adjacent the point of pivotal connection between the elements 10 and 12 for the purpose of preventing the outward movement of the gate bar 12 beyond the desired point. A sleeve type lock 15 slidably engages over the abutting edges of the elements 10 and 12 for maintaining the stanchion in locked position. This sleeve is preferably hollow pipe of the same type as that used in the construction of elements 10 and 12 except that it is of a slightly larger size to permit a snug fit over the ends of the elements enclosed.

The details of the latch are best illustrated in Figure 2. Two vertical slots 16 and 17 are formed through the outer surface of the sleeve in the manner illustrated. The slot 16 is extended laterally to form the diagonal slot 18 and the horizontal slot 19, the slot 18 being directed upwardly in angular fashion. The slot 17 may also be extended laterally to form the horizontal portion 20. Pins 21 and 22 are extended from the outer surface of the elements 10 and 12 respectively for engagement with the horizontal portions of the slots 16 and 17. Both pins 21 and 22 are extended through the center of the elements 10 and 12 respectively and preferably are welded to the opposite side of these elements, an aperture 23 being provided for this purpose in the case of the pin 21. No such aperture is necessary in the case of the pin 22 because it is readily accessible to the welding operation when the gate bar element 12 is in open position.

To lock the stanchion the gate bar element 12 is first swung to vertical position, the sleeve element 15 being at that time positioned as indicated in Figure 2 with the horizontal slot 19 engaging the pin 21. The downwardly extending skirt 26 of the element 15 facilitates alignment between the elements 10 and 12. After alignment of the gate bar, the sleeve 15 is then rotated slightly in a clockwise direction to position the pin 21 in the vertical slot 16. The entire sleeve is then moved downwardly and when the pin 22 has reached the upper end of the slot 17 the sleeve is then rotated in a counterclockwise direction to fully engage the pins 21 and 22 in the slots 18 and 20, respectively. As the pin 21 is engaged in the slot 18 it is necessary to exert a certain amount of downward pressure on the sleeve in its counterclockwise rotation to force the pin to the end of the slot. It is a feature of the latch construction to provide at least two pins which are engaged simultaneously by horizontal portions of their corresponding slots. In the preferred embodiment one of these pins is shown as positioned on the collar member and one on the gate bar. In the preferred embodiment also, one of these horizontal slots extends diagonally (either upwardly or downwardly) whereas the other extends horizontally only. When two pins are inserted into these two differently inclined slots only slightly wider than the pins a frictional engagement is provided between the pins and the sides of the slots which greatly strengthens the security of the latch.

In unlocking, the sleeve is rotated in a counterclockwise direction under upward pressure, slid upwardly and then turned in a clockwise direction to assume the position shown in Figure 2.

When the gate bar 12 is fully extended the U-shaped prong 24 may engage with a stake 25 located in an adjacent position. This substantially prevents twisting of the stanchion while the animal is being disengaged and leaves the gate bar in a convenient position for attachment when it is again desired to confine the animal.

One of the principal advantages of the device is its simplicity. Only three primary parts are required and these may be fabricated cheaply and conveniently from ordinary materials. The sleeve type of lock is particularly appropriate to a structure of this sort because, in the first place, it strengthens greatly the point of union between the fixed member 10 and the movable member 12. In addition, it is a type of lock which may be quickly and easily manipulated with one hand during either the latching or unlocking operation. The particular type of sleeve lock shown is extremely effective in that due to the configuration of the slot 18 it provides a true locked engagement between the members and one which cannot be disengaged by the confined animal. Furthermore the latching and unlatching operations are not affected by the stresses exerted by the animal because once the sleeve has engaged the ends of the elements 10 and 12 the latching or unlatching is simply a matter of manual manipulation of the sleeve.

Having described my invention, I claim:

1. In a cow stanchion, a collar member of general C-configuration, a gate bar swingable across the opening in said member, a slidable and rotatable sleeve for engaging over the adjoining open ends of the collar member and gate bar, pins positioned on the outer surface of said open ends, slots in said sleeve for engagement with the pins when the gate bar is in closed position, said slots having vertical portions permitting vertical movement of the sleeve when the pins are positioned in the slots, one of said slots having a portion extending diagonally laterally from the vertical portion and the other of said slots having a portion extending substantially horizontally from the vertical portion for locking engagement with the pins upon rotation of the sleeve.

2. In a cow stanchion, a collar member of general C-configuration, a gate bar swingable across the opening in said member, a slidable and rotatable sleeve for engaging over the adjoining open ends of the collar member and gate bar, pins positioned on the outer surface of said open ends, slots in said sleeve for engagement with the pins when the gate bar is in closed position, said slots having vertical portions to permit vertical movement of the sleeve, one of said slots having a portion extending diagonally laterally from the vertical portion and another of said slots having a portion extending directly horizontally from the vertical portion whereby simultaneous direction of the pins into both of said slots effects a frictional engagement between the pins and the sides of the slots.

ARTHUR NICKELL.

REFERENCES CITED

The following references are of record in the file of this patent:

UNITED STATES PATENTS

| Number | Name | Date |
|---|---|---|
| 1,752,095 | Langer | Mar. 25, 1930 |
| 1,030,724 | Gleason | June 25, 1912 |
| 1,086,157 | Gleason | Feb. 3, 1914 |
| 904,603 | Crocker | Nov. 24, 1908 |
| 1,554,566 | Egger | Sept. 22, 1925 |
| 949,586 | Lorenzen | Feb. 15, 1910 |
| 589,708 | Flint | Sept. 7, 1897 |

FOREIGN PATENTS

| Number | Country | Date |
|---|---|---|
| 187,372 | British | Oct. 26, 1922 |